Oct. 23, 1951  C. B. TURTON  2,572,218
ATTACHMENT FOR THE ENDS OF ELECTRIC BUS BAR DUCTS
Filed Feb. 17, 1949
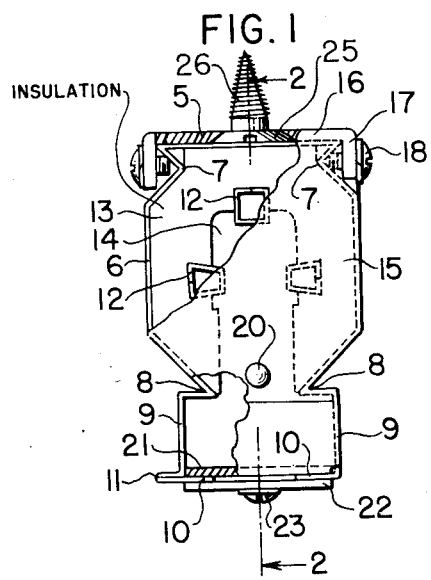
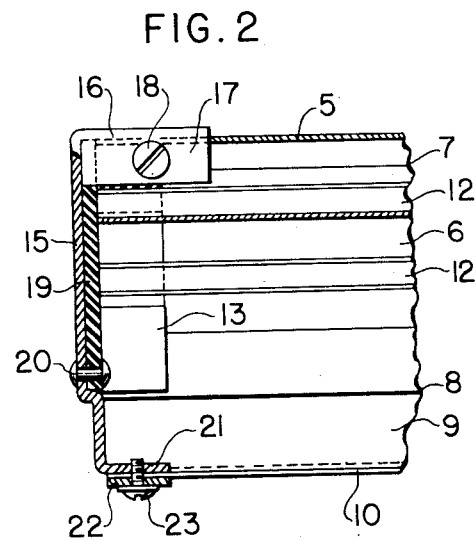
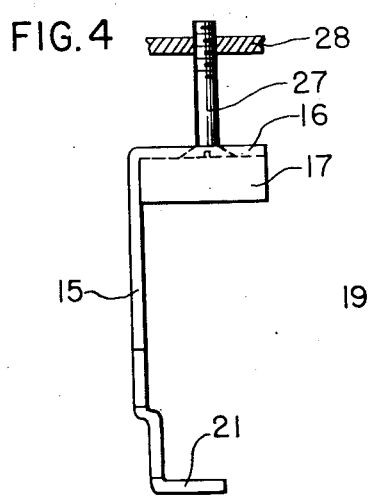
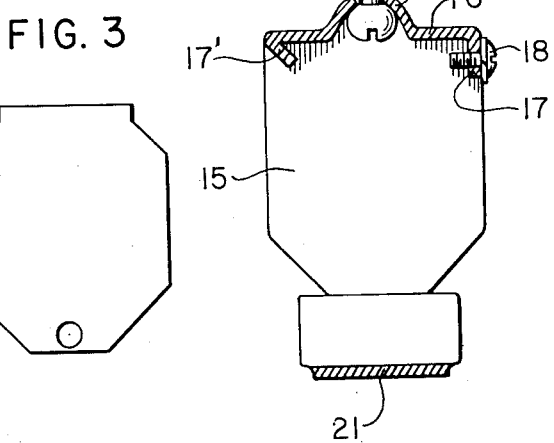
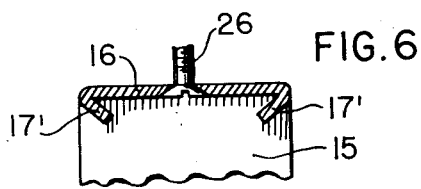
INVENTOR
Cecil B. Turton
BY
ATTORNEY Patented Oct. 23, 1951

2,572,218

UNITED STATES PATENT OFFICE 2,572,218

ATTACHMENT FOR THE ENDS OF ELECTRIC BUS BAR DUCTS

Cecil B. Turton, Plainville, Conn., assignor, by mesne assignments, to General Electric Company, a corporation of New York Application February 17, 1949, Serial No. 76,874

5 Claims. (Cl. 174—74)

My invention relates to a closure device for the end of a duct of the type employed in a system of power distribution utilizing bus bars from which insertable plug-in or trolley collectors draw current for branch circuits.

The main object is to provide a simple but effective device that can be readily and securely applied to a duct or removed at will by the use of a simple tool such as a screw driver.

A particular object is to protect and reinforce the end of the duct and its bus bars.

Another object is to insulate the ends of the bus bars.

Another object is to provide for the support of the end of a bus bar duct.

Fig. 1 is an end view partially in section showing the device as applied to a bus bar duct.

Fig. 2 is a side and sectional view taken on the plane of the line 2—2 of Fig. 1.

Fig. 3 is a detail view of an insulating plate for closing the ends of the bus bars.

Fig. 4 is a edge and partial section of the end plate showing a bolt-like hanger.

Fig. 5 is a view of the inner face of the end plate showing another form of hanger.

Fig. 6 is an end view showing a fragment of another modification.

The form of duct for which the invention is particularly adapted is formed of sheet metal, drawn, rolled, or otherwise suitably formed to the desired section. As shown the duct is closed at the top 5 as viewed in Figs. 1 and 2 and its sides 6, 6 are indented along each side at 7 and 8, to provide a chamber for receiving the bus bars and it has a channel along the lower face bounded by side members 9 and inner bottom flanges 10, 10 to receive trolley wheels or conductors. An outer flange 11 may also be provided along one edge.

Such a system may employ two, three or four bus bars such as 12 which are supported at intervals by insulators such as 15. These insulators are suitably secured in place and are usually of U-shape so as to provide clearance space 14 for the insertion or movement of the take-off plugs or collectors (not shown). Such clearance space however is not always necesary at the end of the duct although the ends of the bus bars will usually be exposed and supported.

The closure has a main plate portion 15 shaped to cover the end of the duct and provided with a cross-piece 16 which overlies and rests upon the top of the duct. It has depending side flanges 17 for securing the closure to the upper part of the duct in which screws 18 are adjustable into the indented grooves 7, 7.

To the inside of the closure plate an insulating plate 19 is secured by a rivet or screw 20. This plate 19 is made of suitable size and shape to entirely cover the ends of the bus bars. The lower part of the duct however does not need such insulation.

The lower end of the closure plate has a flange or foot 21 adapted to fit in the duct on top of the flanges 10, 10 and between the sides 9, 9. These flanges are clamped together by a cross-piece 22 below the flanges 10, 10 and a screw 23 screwed into flange 21.

It will be seen that such a closure may be readily applied to any end of a standard duct without requiring any change or alteration of the duct or bus bars and may be readily removed leaving the duct and bus bars in condition for attachment of another duct section in the usual manner.

In Fig. 1, I have shown an opening 25 in the top of the plate to receive a screw 26 by which the attachment plate may be secured to a ceiling or side wall for supporting the end of the attached duct.

An alternative means for supporting the end of the duct from overhead is shown in Fig. 4 where the bolt 27 passes up through the head of the plate 16 and is anchored or adjustably secured to the overhead member 28. This form also has flanges 17 for connection with the upper edges of the duct.

Fig. 5 shows another modification in which the part 16 is provided with a projecting portion 30 which provides a socket for the head 31 of the hanger member 32 to permit the plate and the attached duct to turn.

In this case the plate has depending flanges 17 and 17' for connection with the duct. Flange 17' is bent inward to interlock with one of the indented or grooved portions 7 of a duct and the other flange 17 has a set screw 18 as in Figs. 1 and 2.

In Fig. 6 the head or cross-piece 16 of the end plate has two inturned flanges 17', 17' adapted to slide into the indented or grooved portions 7, 7 of a duct for attaching the plate to the upper edges of the duct.

By such means for suspending the duct, the load is distributed through the plate 15 from the upper to the lower walls of the duct.

I claim:

1. The combination of a bus bar duct having a top wall and side walls with longitudinal grooves at the junctions of the top wall and the side walls and spaced bottom flanges, and containing longitudinal bus bars, an end closure having a plate fitted to the end of said duct and covering the ends of said bus bars, said plate having a head piece overlying the adjacent portion of the top wall of the duct and having side flanges with clamping means engaging in said grooves, said plate having a bottom flange fitted to the bottom flanges of the duct.

2. The combination of a bus bar duct having a top wall and side walls with longitudinal grooves adjacent the junctions of the top wall and the side walls and spaced bottom flanges and containing longitudinal bus bars together with an end closure having a plate fitted to the end of said duct and covering the ends of said bus bars, said plate having a head piece overlying the top wall of the duct and side flanges having clamping means engaging in said grooves, said plate having a flange fitted to the bottom flanges of the duct and means for clamping said flanges together.

3. In a bus bar duct system, the combination of a duct section having a top wall, bottom flanges with a slot between the flanges, side walls connecting the opposite edges of the top wall with the respective flanges, each side wall having a groove adjacent an edge of the top wall, bus bars supported in the duct section and accessible through said slot and an end closure for a duct section comprising an end plate having a head flange overlying the end of the top wall of the duct section, means at the edges of the head flange engaging in the respective grooves for clamping the end closure to the duct section, a flange at the foot of the end plate overlapping the bottom flanges of the duct section and means for clamping the flange of the end closure to the flanges of the duct section including a screw passing through the slot between the flanges of the duct section.

4. A closure for the end of a bus duct having top and side walls and an open bottom with opposed flanges thereacross including a plate member fitting an open end of the duct and having an integral laterally extending flange at the top, an integral lateral flange at the bottom extending in the same direction, said top flange having integral downwardly extending side flanges, a device on the top flange for suspending the duct from an overhead support, and means on the side flanges for clamping the plate to the side walls of the duct, said bottom flange having means for fastening the plate to the opposed bottom flanges of the duct.

5. In a bus bar duct system, the combination of a duct section having a top wall, bottom flanges with a slot between the flanges, side walls connecting the opposite edges of the top wall with the respective bottom flanges, bus bars supported in the duct section and accessible through said slot and an end closure for the duct section comprising an end plate having a head flange overlying the end of the top wall of the duct section, side flanges at the edges of the head flange, means for clamping the side flanges of the end closure to the duct section, a flange at the foot of the end plate overlapping the bottom flanges of the duct section and means for clamping the flange at the foot of the end closure to the bottom flanges of the duct section.

CECIL B. TURTON.

REFERENCES CITED

The following references are of record in the file of this patent:

UNITED STATES PATENTS

| Number | Name | Date |
| --- | --- | --- |
| 1,217,398 | Bonnell | Feb. 27, 1917 |
| 2,042,778 | Frank et al. | June 2, 1936 |
| 2,291,490 | Naysmith | July 28, 1942 |
| 2,384,487 | O'Brien | Sept. 11, 1945 |